United States Patent [19]
Knebel

[11] 3,931,985
[45] Jan. 13, 1976

[54] COLLAPSIBLE CART

[76] Inventor: Eric Knebel, 5147 Burlingame Drive, Atlanta, Ga. 30340

[22] Filed: Dec. 2, 1974

[21] Appl. No.: 528,771

[52] U.S. Cl.................................... 280/42; 220/7
[51] Int. Cl.² ........................................ B62B 11/00
[58] Field of Search............ 280/36 R, 36 C, 38, 39, 280/40, 42, 47.17, 47.18, 47.24, 47.37, 79.2, 79.3; 220/6, 7

[56] References Cited
UNITED STATES PATENTS

| 762,747 | 6/1904 | Notbohm | 280/47.18 |
| 1,180,294 | 4/1916 | Hunter | 220/7 |
| 1,879,102 | 9/1932 | Collins | 220/6 |

FOREIGN PATENTS OR APPLICATIONS

| 221,768 | 1/1943 | Switzerland | 280/42 |

Primary Examiner—Robert R. Song
Attorney, Agent, or Firm—Newton, Hopkins & Ormsby

[57] ABSTRACT

A collapsible cart is disclosed comprising a pair of wheels supporting a pair of spaced side walls above cart supporting terrain a predetermined distance. A pair of floor members are pivotably supported together and with the end walls for movement between a floor expanded position along a common plane extending between the side walls and a floor collapsed position extending downwardly from the side walls. Two pairs of end walls are pivotably joined to opposite ends of the side walls and to each other for movement between expanded positions extending normally between the side walls with the floor members in the floor expanded position and folded positions between the side walls with the floor members in the floor collapsed position. Each of the floor members extend from the side walls a distance greater than the predetermined distance whereby the cart may be stored in a collapsed configuration with a cart supported upon the cart supporting terrain by the collapsed floor members themselves with the wheels raised above the terrain.

13 Claims, 7 Drawing Figures

COLLAPSIBLE CART

BACKGROUND OF THE INVENTION

This invention relates generally to hand carts such as those used in supermarkets, warehouses, and the like, and particularly to hand carts of the type which may be collapsed for storage.

Collapsible type carts and carriers have existed for a number of years. For example, in U.S. Pat. No. 2,564,939 a foldable shopping cart is disclosed having sides hinged for inward folding movement. In U.S. Pat. No. 3,092,395 a corrugated shopping cart is presented having both sides and front panel members which may be folded to overlay one another. Similarly, U.S. Pat. No. 3,305,243 teaches a luggage cart having coplanar floor members which may be folded one atop the other. Other representative prior art patents illustrating collapsible carts include U.S. Pat. No. 3,191,959, 3,194,576, and 3,774,929. The present invention relates to improvements in such collapsible type carts.

Accordingly, it is a general object of the present invention to provide an improved collapsible cart.

More specifically, it is an object of the present invention to provide a cart which may be readily collapsed into a compact configuration for storage in minimal space.

Another object of the invention is to provide a collapsible cart having one or more pairs of support wheels which cart may be readily collapsed and stored with the wheels raised above the cart supporting terrain.

Another object of the invention is to provide a collapsible cart with catch means for releasibly supporting floor panels in a mutual coplanar configuration when the cart is disposed in an open configuration, and for releasibly holding the side panels closely together when the cart is disposed in the collapsed configuration.

Yet another object of the invention is to provide a collapsible cart of the type described which may be fabricated from relatively few structurally distinct components, some of which may serve dual structural functions.

SUMMARY OF THE INVENTION

In one form of the invention, a collapsible cart is provided comprising a pair of side panels and a pair of wheels rotatably mounted to the pair of side panels. A pair of bottom panels are hinged together and to the pair of side panels. A first pair of end panels are hinged together and to first adjacent ends of the pair of side panels, and a second pair of end panels are hinged together and to second adjacent ends of the pair of side panels.

In another form of the invention, a collapsible cart is provided comprising a pair of spaced side walls and wheel means for movably supporting the side walls. A pair of floor members are hinged to the side walls and to each other along a plane extending between the side walls in substantially parallel relation therewith. Two pairs of end walls are hinged to opposite ends of the side walls with the walls of each pair of end walls hinged to each other along the just mentioned plane.

In yet another form of the invention a collapsible cart is provided comprising a pair of wheels and a pair of spaced side walls at least partially supported above cart supporting terrain by the pair of wheels. A pair of floor members are pivotably supported together and to the side walls for movement between a floor expanded position along a common plane extending between the side walls and a floor collapsed position extending downwardly from the side walls. At least one pair of end walls are pivotably joined to the side walls for movement between an expanded position extending substantially normally between the side walls with the floor members in the floor expanded position and a folded position between the side walls with the floor members in the floor collapsed position. Preferably, each of the floor members extend from the side walls a distance greater than the distance the side walls are supportable above cart supporting terrain by the pair of wheels whereby the cart may be stored in a collapsed configuration with the cart supported by the collapsed floor members on cart suppporting terrain with the wheels raised above the terrain.

DETAILED DESCRIPTION OF THE DRAWING

Figure 1:
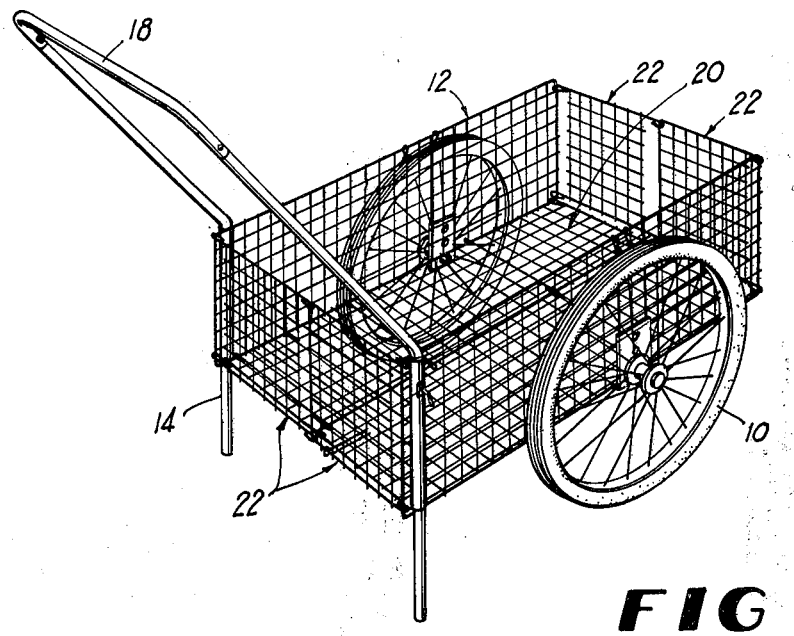
FIG. 1 is a perspective view of a collapsible cart embodying principles of the invention in a preferred form shown in an opened configuration.
Figure 3:
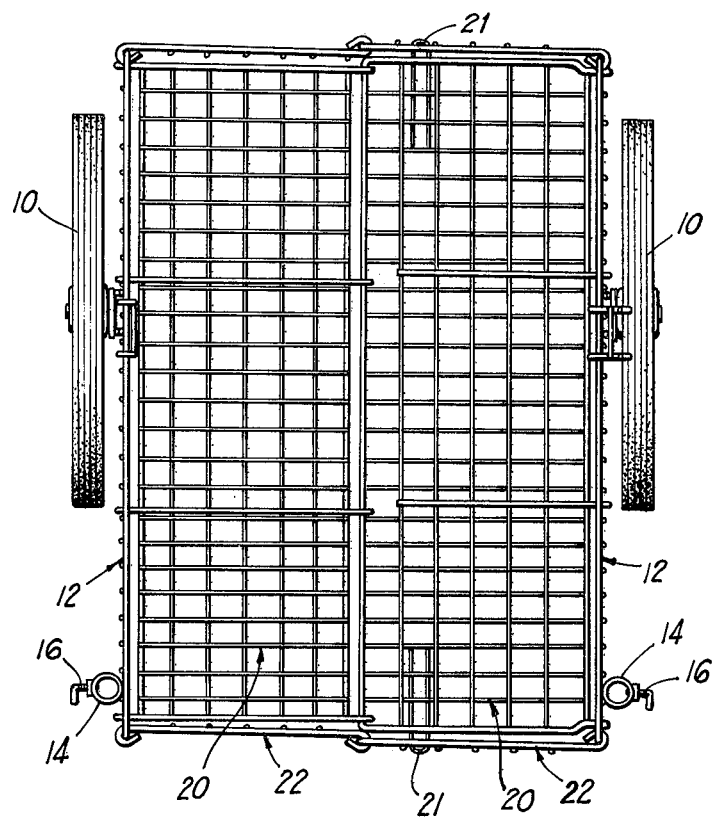
FIG. 3 is a plan view of the cart illustrated in FIG. 1 in an opened configuration.
Figure 4:
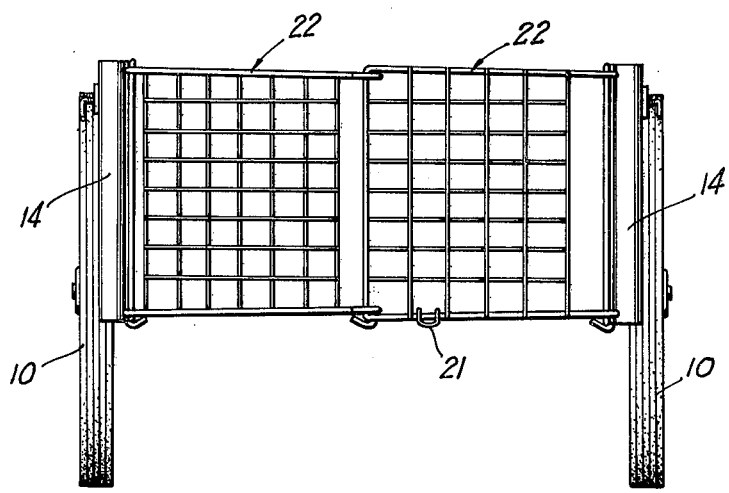
FIG. 4 is an end on view in elevation of the cart illustrated in FIG. 1 in an opened configuration.

Referring now in more detail to the drawing, there is shown in FIGS. 1, 3 and 4 a collapsible cart in an opened or expanded configuration comprising a pair of wheels 10 rotatably supported on a pair of side walls or panels 12 in conventional fashion. A pair of tubular legs 14 are mounted in a vertical orientation to one end of each side wall with the bottoms thereof terminating along the horizontal plane with which wheels 10 are tangent. Each tubular support 14 is provided with a set screw 16 for releasably detenting a U-shaped upswept handle 18 therewithin.

With continued reference to these three Figures the cart is further seen to include a pair of bottom panels or floors 20 hinged together along a vertical plane passing approximately midway between side walls 12 in a substantially parallel relation therewith. Each floor is also hinged to the bottom of an adjacent side wall 12 for movement between the mutually co-planar relation shown in these three Figures and that of a mutually folded relation hereinafter described. A pair of U-shaped rods 21 extend from each end of one floor to serve as catch means for supporting both floors upon two pairs of end walls 22. This is done by placing an arcuate portion of the rods distal the floor upon adjacent end walls as shown most clearly in FIG. 5.

End walls or panels 22 are seen to be hinged to opposite ends of side walls 12 with the members of each pair being hinged together along the vertical plane along which bottom panels 20 are hinged together. Each pair of end walls is hinged together and to the side walls in such a manner as to permit movement from the mutually co-planer relation shown in FIGS. 1, 3 and 4 to a mutually folded configuration extending either outwardly from or inwardly between the side walls as hereinafter further described.

Figure 5:
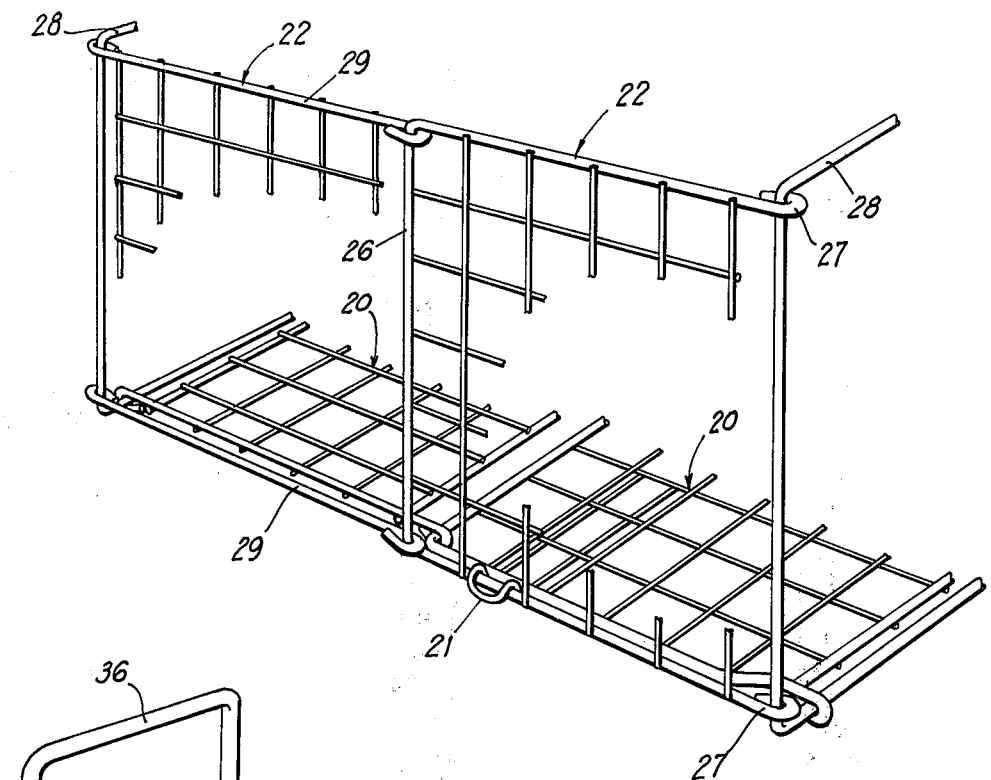
FIG. 5 is a perspective view of a portion of one pair of end walls of the cart shown in FIG. 1.

The side walls, floor members, and end walls are all seen here to be of wicker or mesh construction comprising two sets of parallel rods overlaying one another at substantially right angles as shown most clearly in FIGS. 3, 4 and 5. Preferably, the overlaying rods are welded together at each crossing for rigidity of construction. The framing rods about the periphery of the side walls or panels are of rectangular shape while those framing the floor and end wall panels are of straight and U-shape constructions with unitary hook ends. These framing rods, to which the rods framed thereby are welded, thus provide both a hinging arrangement between hinged panels as well as structural elements. For example, in FIG. 5 one end wall 22 is seen to include a U-shaped rod 26 having a hook 27 formed on each end thereof about a rectangular framing rod 28 of a side wall 12. The hooked ends are curved about rods 28 sufficiently close to prevent accidental separation while yet sufficiently loose to permit the end walls to pivot about the framing rods of the side walls. In FIG. 5 the other end wall 22 is seen to comprise a straight rod 29 at the top and bottom of the wall which are hinged to a rectangular framing rod of side wall 12 as well as to the U-shaped framing rod of the other end wall.

Figure 2:
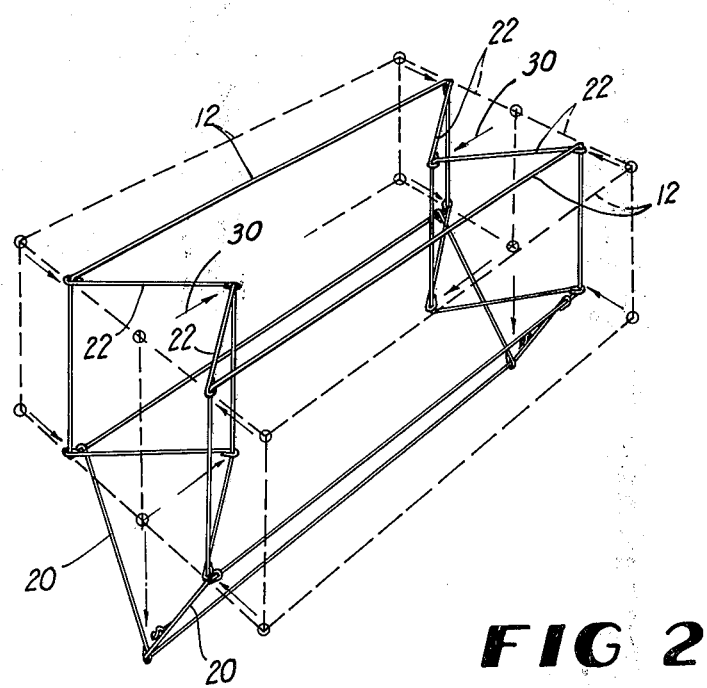
FIG. 2 is a diagrammatical view in perspective of the cart shown in FIG. 1 being collapsed.
Figure 7:
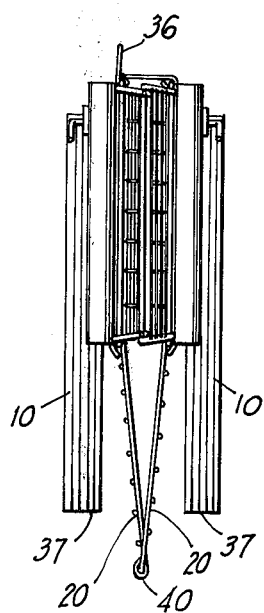
FIG. 7 is an end on view of the cart illustrated in FIG. 1 shown in a collapsed configuration.

With reference next to FIG. 2 the cart is seen to be partially collapsible from the generally rectangular, boxshaped configuration shown in dashed lines. This may be accomplished by manually urging the end walls inwardly towards one another between side walls 12 as indicated by arrows 30. At the same time the floors 20 are forced to pivot from their substantially co-planar relation to a generally V-shaped configuration folding downwardly beneath the inwardly converging end walls. Simultaneously with this operation the side walls 12 themselves are pulled together. Once the collapsing operation is completed the cart assumes the configuration illustrated in FIG. 7 with the lowermost hinged portion of the floors extending beneath the bottom of wheels 10.

Figure 6:
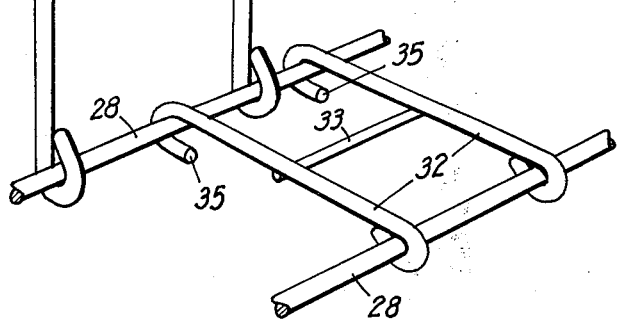
FIG. 6 is a perspective view of catch means provided with the cart illustrated in FIG. 1 for releasably holding the side walls thereof close together for storage.

In the cart collapsed configuration the side walls 12 may be held together by a catch means shown in FIG. 6 to comprise a pair of parallel bars 32 joined together by a strut 33 with one end of the bars formed with a hook permanently hinged over side wall framing rod 28. The opposite end of each rod 32 is also provided with a hook end 35 having sufficient space between the end of the hook and the straight central portion of the rod to permit passage of the other framing rod 28 of the opposite side wall 12 therebetween. With this configuration the cart side walls may be held closely together by the catch means by merely compacting the cart momentarily sufficiently to enable hook ends 35 of the rods 32 to be slipped over the framing rod 28 and then released. A pivotable handle 36 of generally U-shaped construction is also mounted to rod 28 by means of hook ends on the handle pivotably secured about the rod. It should be noted that handle 36 is located adjacent the catch for the side walls to facilitate a rapid closing and successive lifting operation.

With reference once again to FIG. 7, it will be noted that the extension of the floor members beneath the bottom of wheels 10 is attributable to the relative sizes of the floor panels with respect to the distance wheel 10 extends beneath the bottom of the side walls to which the floor members are pivoted. Thus, with each floor 20 extending a distance from the side wall to which it is hinged greater than the distance wheels 10 extend beneath the side walls to which they are rotatably mounted the mutually hinged portion 40 of the floors is seen to be positioned beneath the bottom 37 of wheels 10. With this configuration the cart may be easily stored upon supporting terrain by leaning an upper portion of the cart against a supporting wall with wheels 10 elevated above the floor. So supported, the cart does not tend to roll along or away from the supporting wall.

To reopen the cart to its initial position as shown in FIGS. 1, 3 and 4 hook ends 35 of the catch rods 32 are removed from one frame rod 28. Side walls 12 are then pulled apart which action raises floors 20 and unfolds end walls 22. Once the side walls are spaced well apart the end walls may be manually positioned along a common plane thereby placing the cart in its fully opened or extended position. The arcuate ends of U-shaped rods 21 secured to floor 20 may then be set upon the U-shaped framing rod member of end walls 22 to support the floor along a common plane. If desired, an auxiliary, vertical extension of the side walls and foldable end walls may be provided for added capacity by conventional corrugated U-shaped hooks or the like.

It should be understood that the just described embodiment merely illustrates principles of the invention in a preferred form. Many modifications, additions and deletions may, of course, be made thereto without departure from the spirit and scope of the invention as set forth in the following claims.

What is claimed is:

1. A collapsible cart comprising, in combination, a pair of side panels; a pair of wheels rotatably mounted to said pair of side panels; a pair of bottom panels hinged together and to said pair of side panels; a first pair of end panels hinged together and to first adjacent ends of said pair of side panels; and a second pair of end panels hinged together and to second adjacent ends of said pair of side panels opposite said first adjacent ends.

2. A collapsible cart in accordance with claim 1 further comprising catch means for releasibly supporting said pair of bottom panels on said first and second pairs of end panels.

3. A collapsible cart in accordance with claim 2 wherein said catch means comprises first and second bars rigidly secured to opposite ends of said pair of bottom panels with an arcuate end portion of each bar jutting out beyond one of said opposite ends of overlay a portion of the first and second pairs of end panels when the cart is disposed in an opened configuration.

4. A collapsible cart in accordance with claim 1 further comprising catch means for releasibly holding said side panels closely together when the cart is disposed in a collapsed configuration.

5. A collapsible cart in accordance with claim 4 wherein said catch means comprises a pair of parallel bars having one end rotatably mounted to one of said side panels and with the other end being of U-shaped configuration adapted to be releasibly secured about the other of said side panels.

6. A collapsible cart in accordance with claim 1 further comprising means for releasibly supporting said pair of bottom panels on said pairs of end panels in a substantially coplanar configuration with the cart disposed in an open configuration, and means for releasibly holding said side panels closely together with the bottom panels folded in a side by side position with the cart disposed in a collapsed configuration.

7. A collapsible cart comprising a pair of spaced side walls; wheel means for movably supporting said side walls; a pair of floor members hinged to said side walls and hinged to each other along a plane extending between said side walls in substantially parallel relation therewith; and two pairs of end walls hinged to opposite ends of said side walls with the walls of each pair of end walls hinged to each other along said plane.

8. A collapsible cart in accordance with claim 7 comprising catch means for releasibly supporting said pair of floor members in a substantially mutual coplanar configuration on said pairs of end walls.

9. A collapsible cart in accordance with claim 7 comprising catch means for releasibly holding said side walls closely together with said end walls and said floor members folded therebetween.

10. A collapsible cart comprising a pair of wheels; a pair of spaced side walls at least partially supported above cart supporting terrain by said pair of wheels; a pair of floor members pivotably supported together and to said side walls for movement between a floor expanded position along a common plane extending between said side walls and a floor collapsed position extending downwardly from said side walls; and at least one pair of end walls pivotably joined to said side walls for movement between an expanded position extending substantially normally between said side walls with said floor members in said floor expanded position and a folded position extending angularly between said side walls with said floor members in said floor collapsed position whereby the cart may be positioned in an expanded position with the pair of wheels upon cart supporting terrain, the pair of floor members disposed along a common plane extending between the side walls, and the pair of end walls extending normally between the side walls, and a collapsed position with the pair of floor members disposed in a collapsed position extending downwardly from the side walls, the pair of end walls disposed in a folded position between the side walls, and the pair of wheels raised above the cart supporting terrain.

11. A collapsible cart in accordance with claim 10 wherein said floor members extend from said side wall a distance greater than the distance said side walls are supportable above cart supporting terrain by said pair of wheels, whereby the cart may be stored in a collapsed configuration with the cart supported by the collapsed floor member upon cart supporting terrain with the pair of wheels raised above the terrain.

12. A collapsible cart in accordance with claim 11 comprising first catch means for releasibly supporting said pair of floor members in said floor expanded position upon said pair of end walls, and second catch means for releasibly holding said side panels closely together with said pair of floor members in said floor collapsed position.

13. A collapsible cart in accordance with claim 10 wherein said pair of end walls are pivotably joined to said side walls for movement between an inwardly folded position extending angularly between said side walls and an outwardly folded position extending angularly out from said side walls.

* * * * *